United States Patent
Umemoto et al.

[11] Patent Number: 6,150,299
[45] Date of Patent: Nov. 21, 2000

[54] CERIUM- AND ZIRCONIUM-BASED MIXED OXIDE, METHOD OF PRODUCING SAME AND CATALYST MATERIAL FOR EXHAUST GAS PURIFICATION

[75] Inventors: Yoshichika Umemoto; Toshio Nakatani; Kimio Ohuchi, all of Osaka, Japan

[73] Assignee: Daiichi Kigenso Kagaku Kogyo Co., Ltd., Osaka, Japan

[21] Appl. No.: 09/267,637

[22] Filed: Mar. 15, 1999

[30] Foreign Application Priority Data

May 11, 1998 [JP] Japan .................................. 10-127966

[51] Int. Cl.[7] .................................................. B01J 23/00
[52] U.S. Cl. .......................... 502/304; 502/217; 501/103; 501/126; 423/213.2; 423/239.1; 423/245.1; 423/247
[58] Field of Search ..................................... 502/304, 217; 501/103, 126; 423/213.2, 239.1, 245.1, 247

[56] References Cited

U.S. PATENT DOCUMENTS

| | | | |
|---|---|---|---|
| 4,791,091 | 12/1988 | Bricker et al. | 502/303 |
| 4,857,296 | 8/1989 | Brunelle et al. | 423/574 R |
| 4,902,655 | 2/1990 | Snyder et al. | 501/152 |
| 5,010,052 | 4/1991 | Quemere | 502/304 |
| 5,075,275 | 12/1991 | Murakami et al. | 502/303 |
| 5,130,114 | 7/1992 | Igarashi | 423/652 |
| 5,171,551 | 12/1992 | Quemere | 423/230 |
| 5,191,139 | 3/1993 | Larkin et al. . | |
| 5,278,123 | 1/1994 | Chopin et al. | 502/200 |
| 5,380,692 | 1/1995 | Nakatsuji et al. | 502/303 |
| 5,491,120 | 2/1996 | Voss et al. | 502/304 |
| 5,550,096 | 8/1996 | Inoue et al. | 502/217 |
| 5,580,536 | 12/1996 | Yao et al. | 423/263 |
| 5,693,588 | 12/1997 | Poston | 502/400 |
| 5,753,192 | 5/1998 | Dobson et al. | 422/177 |
| 5,879,645 | 3/1999 | Park et al. | 423/213.2 |
| 5,888,464 | 3/1999 | Wu et al. | 423/213.5 |
| 5,898,014 | 4/1999 | Wu et al. | 502/302 |
| 5,908,800 | 6/1999 | Bonneau et al. | 501/103 |
| 5,925,590 | 7/1999 | White et al. | 502/302 |
| 5,958,827 | 9/1999 | Suda et al. | 502/304 |
| 5,958,828 | 9/1999 | Murakami et al. | 502/333 |
| 6,030,914 | 2/2000 | Matsui | 501/103 |
| 6,040,265 | 3/2000 | Nunan | 502/242 |

FOREIGN PATENT DOCUMENTS

| | | |
|---|---|---|
| 2 736 343 A1 | 1/1997 | France . |
| 2 149 680 | 6/1985 | United Kingdom . |
| WO 98/47605 | 10/1998 | WIPO . |

*Primary Examiner*—Tom Dunn
*Assistant Examiner*—Cam N. Nguyen
*Attorney, Agent, or Firm*—Sughrue, Mion, Zinn, Macpeak & Seas, PLLC

[57] ABSTRACT

Mixed oxides excellent in thermal stability of specific surface area and in oxidation-reduction performance are provided on an industrial scale. Catalyst materials useful in exhaust gas purification are also provided. The invention is concerned with mixed oxides containing cerium, zirconium and sulfur, namely cerium- and zirconium-based mixed oxides having the composition: 50 to 79% by weight as cerium oxide, 20 to 49% by weight as zirconium oxide, and 1 to 5% by weight as sulfate ($SO_4$). The invention also relates to a method of producing cerium- and zirconium-based mixed oxides which comprises mixing a cerous-alkali metal sulfate double salt with a zirconium ion-containing solution and then adding a base to the mixed solution to thereby cause formation of a precipitate. The invention further relates to catalyst materials for exhaust gas purification which comprise a mixed oxide containing cerium, zirconium and sulfur, namely a cerium- and zirconium-based mixed oxide containing sulfur in an amount of 0.5 to 5% by weight as sulfate ($SO_4$).

14 Claims, 3 Drawing Sheets

● SPECIFIC SURFACE AREA
○ HYDROGEN CONSUMPTION

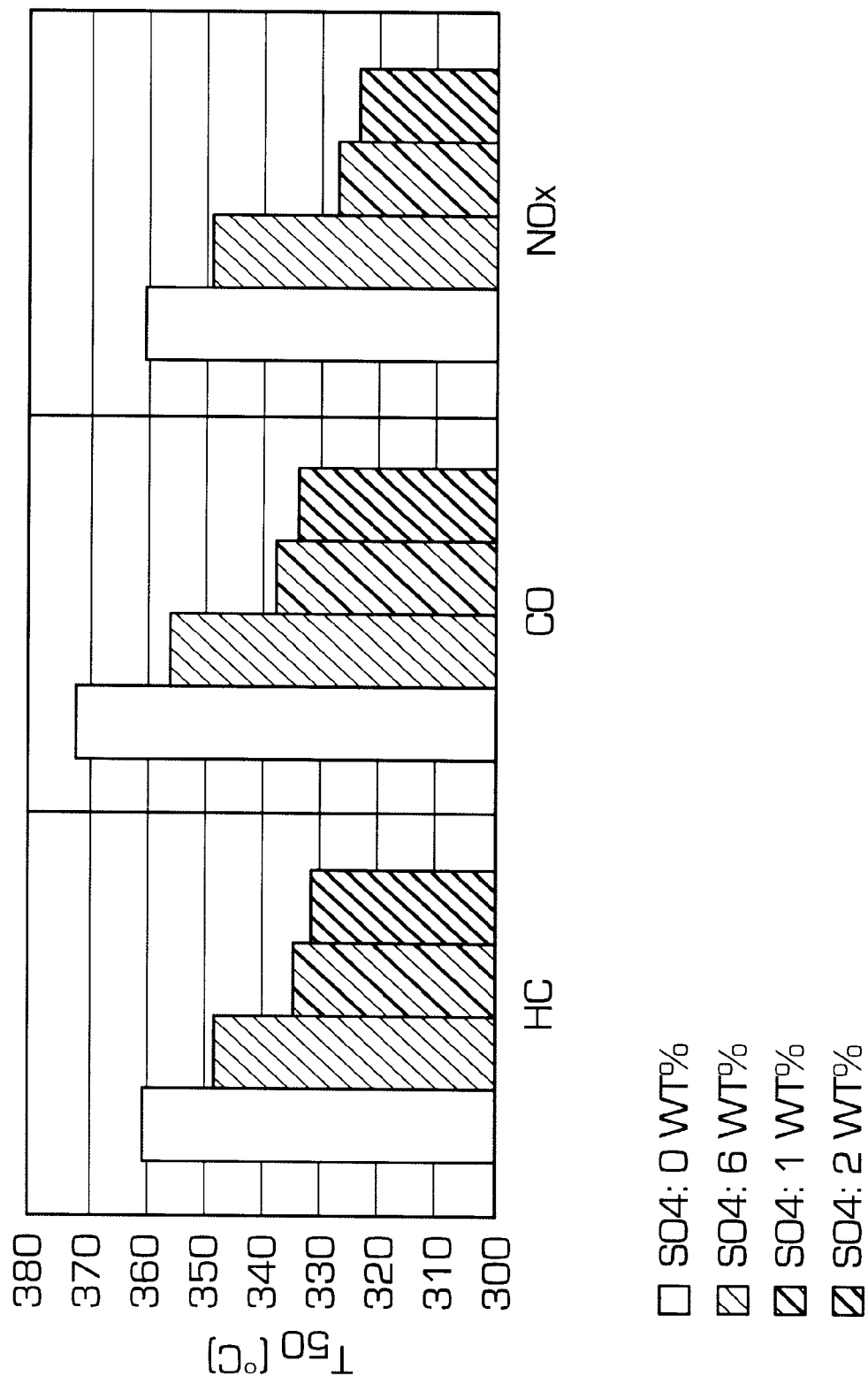

CERIUM- AND ZIRCONIUM-BASED MIXED OXIDE, METHOD OF PRODUCING SAME AND CATALYST MATERIAL FOR EXHAUST GAS PURIFICATION

FIELD OF THE INVENTION

The present invention relates to a novel cerium- and zirconium-based mixed oxide and a method of producing the same. The present invention further relates to a novel catalyst material for exhaust gas purification which comprises said mixed oxide.

BACKGROUND OF THE INVENTION

Three-way catalysts for simultaneously eliminating hydrocarbons (HC), carbon monoxide (CO) and nitrogen oxides (NOx) from exhaust gases emitted from internal-combustion engines of automobiles and the like generally comprise a platinum group element such as platinum, rhodium or palladium, in combination with cerium oxide having oxidation-reduction performance (oxygen storing effect) and serving to improve the low-temperature catalyst activity.

However, at high temperatures exceeding 800° C. the oxidation-reduction performance of catalysts containing a platinum group element and cerium oxide markedly reduce as a result of grain growth of cerium oxide. In this connection, a number of proposals have been made to add an oxide of a rare earth element and/or of zirconium to thereby inhibit the grain growth (crystallization) of cerium oxide and maintain the oxidation-reduction performance thereof up to high temperatures (for example, Japanese Kokai Tokkyo Koho S64-58347; Japanese Kokai Tokkyo Koho S63-116741). It has also been disclosed that a mixed oxide containing cerium oxide and zirconium oxide be prepared and use the same as a catalyst (for example, Japanese Kokai Tokkyo Koho S62-168544; Japanese Kokai Tokkyo Koho H01-281144; Japanese Kokai Tokkyo Koho H04-284847). It is thus known that mixed oxides containing cerium oxide and zirconium oxide can be utilized as promoters or catalyst supports for exhaust gas treatment catalysts for improving the heat resistance or oxidation-reduction performance of platinum group elements, which are active catalyst components.

As regards the mixed oxides containing cerium oxide and zirconium oxide, a number of methods have been disclosed of improving the characteristics, for example thermal stability of specific surface area, oxidation-reduction performance etc. of the mixed oxides in order to improve the functions thereof as promoters or catalyst supports for exhaust gas treatment catalysts (for example, Japanese Kokai Tokkyo Koho H04-55315; Japanese Patent No. 2,698,302; Japanese Kokai Tokkyo Koho H05-286722; Japanese Kokai Tokkyo Koho H09-278444).

Meanwhile, today, environmental safeguard measures are being pushed forward and, with the recent tightening of legal regulations with regard to exhaust gases, the endurance temperature required with regard to the thermal stability of specific surface area and the deterioration of oxidation-reduction performance of a promoter (co-catalyst) and/or catalyst support is now as high as about 1,000° C.

However, in the case of the conventional cerium oxide-zirconium oxide mixed oxides, the thermal stability of specific surface area is at most about 20 m$^2$/g after heat treatment at 1,000° C. and, even when the mixed oxides are not heat-treated, the oxidation-reduction performance is such that the hydrogen consumption is at most about 5 cc/g.

Furthermore, it is known that, under certain conditions of running of automobiles (for example during 10-mode test (emission test mode) in Japan), most of the total emission of unpurifiable hydrocarbons is emitted at lower temperatures than the temperature at which the catalysts can start functioning. The temperature at which a catalyst begins to function is referred to as $T_{50}$ (temperature at which the purification degree reaches 50% of the maximum degree of purification) and it is known that the increase in the content of a noble metal such as platinum, which is an active component of the catalyst, results in shifting of the $T_{50}$ to the lower temperature side. However, the increase in the content of such a noble metal not only results in an increase in production cost but also in exhaustion of resources. Therefore, it is also necessary to improve the catalyst performance in a low temperature region without relying on the increase in noble metal content.

On the other hand, a general method of unifying cerium oxide and zirconium oxide homogeneously comprises adding a base to a cerium ion- and zirconium ion-containing aqueous solution and recovering the double salt precipitate (for example, Japanese Kokai Tokkyo Koho H09-278444).

However, the double salt precipitate obtained by the above method occurs as a gel-like bulky hydroxide with a high content of water. Therefore, a filtration or solid-liquid separation step is essential for the elimination of impurities. The rate of processing per lot is inevitably low and a vast quantity of energy is required for conversion to oxides. The conventional methods of production thus cannot be said to be suitable for industrial scale production.

Accordingly, it is a primary object of the present invention to provide a mixed oxide particularly excellent in thermal stability of specific surface area and in oxidation-reduction performance on an industrial scale. Another object of the invention is to provide a catalyst material for exhaust gas elimination which contains said mixed oxide.

SUMMARY OF THE INVENTION

In view of the above-mentioned prior art problems, the present inventors made intensive investigations and found that a mixed oxide prepared by a specific method can achieve the above objects and, as a result, have now completed the present invention.

Thus, the present invention is concerned with a cerium- and zirconium-based mixed oxide as mentioned below, a method of producing the same and a catalyst material for purifying exhaust gases.

1. A cerium- and zirconium-based mixed oxide containing cerium, zirconium and sulfur which has the composition: 50 to 79% by weight as cerium oxide, 20 to 49% by weight as zirconium oxide and 1 to 5% by weight as sulfate (SO$_4$);

2. A method of producing a cerium- and zirconium-based mixed oxide which comprises mixing a cerous-alkali metal sulfate double salt and a zirconium ion-containing solution and adding a base to the resulting mixed solution to thereby cause formation of a precipitate; and 3. A catalyst material for exhaust gas purification which contains a mixed oxide containing cerium, zirconium and sulfur, a cerium- and zirconium-based mixed oxide containing sulfur in an amount of 0.5 to 5% by weight as sulfate (SO$_4$).

BRIEF DESCRIPTION OF THE DRAWINGS

In the accompanying drawings,

FIG. 3 is a graphic representation of the results of an investigation of the effect of the sulfate content on $T_{50}$ as obtained in Test Example 3.

DETAILED DESCRIPTION OF THE INVENTION

Figure 1:
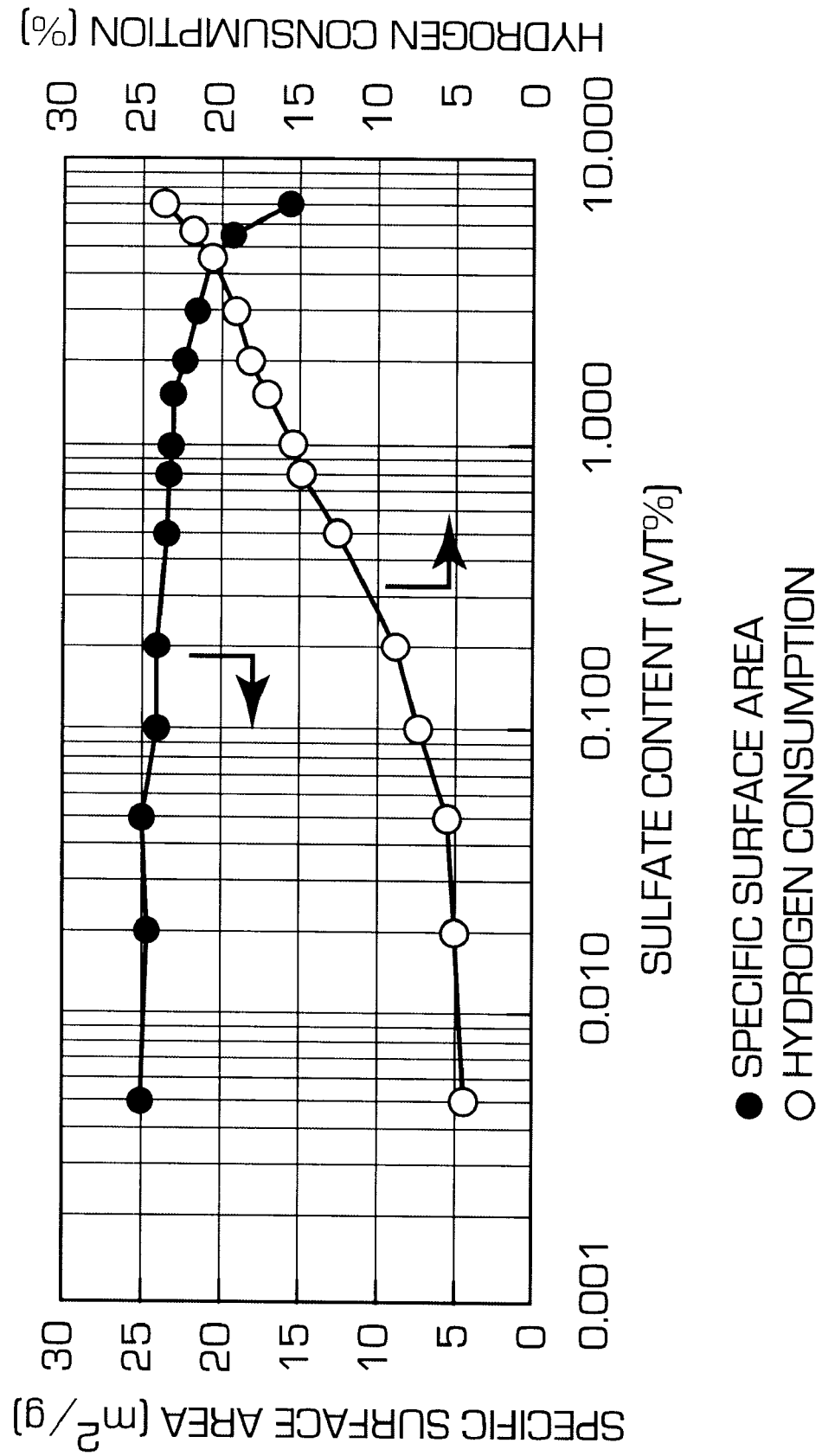
FIG. 1 is a graphic representation of the results of an investigation of the effects of the sulfate content on the specific surface area and on the hydrogen consumption as obtained in Test Example 1.

The cerium- and zirconium-based mixed oxide of the present invention is a mixed oxide containing cerium, zirconium and sulfur, with the composition: 50 to 79% by weight as cerium oxide, 20 to 49% by weight as zirconium oxide and 1 to 5% by weight as sulfate($SO_4$).

First, it is essential according to the present invention that the cerium- and zirconium-based mixed oxide contains sulfur in an amount of 1 to 5% by weight (preferably 1 to 2% by weight) as the sulfate (sulfur in sulfate form). When the sulfate content is within the above range, excellent effects can be produced in particular with respect to thermal stability of specific surface area and oxidation-reduction performance. The present invention also includes those cases where the mixed oxide partly occurs as a solid solution.

The contents of cerium and zirconium can suitably be specified according to the sulfur content and the use of final products. For achieving the above effects more positively, it is advised that the cerium content be generally about 50 to 79% by weight as cerium oxide, preferably 70 to 78% by weight. In the same way, the zirconium content is generally about 20 to 49% by weight as zirconium oxide, more preferably 21 to 28% by weight. When the proportions of these essential components are outside the above ranges, satisfactory oxidation-reduction performance or thermal stability of specific surface area may not be obtained in some cases.

In the practice of the present invention, the proportion (weight ratio) of cerium to zirconium can be determined according to the use of final products. Generally, however, it is advisable that the ratio on the oxide basis be about 1:0.25 to 1, preferably 1:0.25 to 0.3.

The mixed oxide of the present invention may contain one or more other components within limits within which the effects of the present invention will not be lessened. As examples, there may be mentioned rare earth elements such as lanthanum, praseodymium, neodymium, samarium, europium, gadolinium, terbium, dysprosium, holmium, erbium, thulium, ytterbium and ruthenium, alkali metals such as potassium, rubidium and cesium, alkaline earth metals such as magnesium, calcium and strontium, transition metals such as scandium, titanium, tantalum, hafnium, vanadium, chromium, manganese, tungsten, cobalt, platinum, palladium and nickel, and, further, indium, aluminum, silicon, germanium, tin and so on.

In the practice of the present invention, incorporation of at least one of rare earth elements (other than cerium), titanium and hafnium as a fourth component can result in further improvements in thermal stability of specific surface area and other characteristics. The content of the fourth component can suitably be determined according to the kind thereof and other factors and is generally within the range not exceeding 20% by weight, preferably 1 to 5% by weight, as oxide in the mixed oxide.

Generally, the cerium- and zirconium-based mixed oxide of the present invention has a characteristic that the hydrogen consumption after 3 hours of heat treatment at 1,000° C. is generally not less than 15 cc/g, preferably not less than 20 cc/g. The hydrogen consumption is indicative of the oxidation-reduction performance; the higher the value is, the better the oxidation-reduction performance is.

Further, the cerium- and zirconium-based mixed oxide of the present invention generally has a BET specific surface area of not less than 20 $m^2$/g, preferably not less than 25 $m^2$/g, after 3 hours of heat treatment at 1,000° C.

The method of producing the mixed oxide of the present invention is not critical but can be carried out, for example, by mixing a cerous-alkali metal sulfate double salt and a zirconium ion-containing solution and then adding a base to the resulting mixture to thereby cause formation of a precipitate.

As the cerous-alkali metal sulfate double salt, there may be mentioned, for example, compounds represented by the formula $Ce_2(SO_4)_3 \cdot 2M_2SO_4$, $M_3[Ce(SO_4)_3]$ or the like (M: alkali metal). In the practice of the present invention, at least one of these can be used. Among the alkali metals, sodium is particularly preferred. These double salts are generally obtained in the form of crystalline precipitates having low solubility, and commercial products may be used as they are. Products prepared by known methods (refer to, for example, Seiji Takagi: "Shintei Teisei Bunseki Kagaku (Qualitative Analytical Chemistry, Newly Revised Edition)", volume 2 of 3 volumes, pages 471–479, 1932) can also be used.

The zirconium ion-containing solution is not limited to any particular one provided that the zirconium ion (in particular $ZrO^{2+}$ or $Zr^{4+}$) can exist stably therein. Thus, for example, a solution of a zirconium salt in an appropriate solvent can be used. As the zirconium salt, there may be mentioned, for example, inorganic acid salts of zirconium, such as nitrate, sulfate and chloride, and organic acid salts such as acetate. More specifically, zirconium nitrate, zirconium chloride, zirconyl chloride, zirconium sulfate and the like can be used.

The solvent mentioned above may be any solvent capable of dissolving the zirconium salt. Generally, water, alcohols (e.g. methanol, ethanol) and the like can be used. The concentration of the solution can suitably be selected according to the level of addition of the double salt mentioned above and other factors. Generally, it is about 1 to 25% by weight, preferably 15 to 20% by weight.

In cases where the fourth component is incorporated, it is sufficient to cause the mixture to contain the ion of the fourth component. For example, said ion may be added to said solution in the form of a fourth component-containing compound (e.g. inorganic acid salt, organic acid salt), or a solution containing the fourth component may be prepared in advance and then mixed with the above-mentioned solution or double salt. In the practice of the present invention, a solution containing at least one ion of rare earth elements (other than cerium), titanium and hafnium, in particular, is preferably added.

The mixing ratio between the cerous-alkali metal sulfate double salt and the zirconium ion-containing solution may suitably be selected according to the concentration of the solution, the use of the final products and other factors (so that the resulting mixed oxide of the present invention may acquire preferred cerium and zirconium contents and preferred proportions there between as the case may be). It is generally advisable that the temperature of the mixture be about 10 to 50° C.

A base is added to the mixture to cause formation of a precipitate. The base to be used according to the present invention is not limited to any particular species but mention may be made of known alkalis such as sodium hydroxide, potassium hydroxide, sodium carbonate, ammonium carbonate, ammonia, etc. In the practice of the present invention, the use of sodium hydroxide, potassium hydroxide or the like is preferred. It is preferred that these bases be generally added in the form of aqueous solutions. The concentration of the aqueous solution is not critical if, for instance, the pH can be adjusted. It is generally advisable that said concentration be about 5 to 30% by weight, preferably 20 to 25% by weight.

In accordance with the present invention, the sulfate content in the mixed oxide can particularly be adjusted by varying the level of addition of the base (namely, pH). It is generally advisable that the pH of the mixture be about 12.5 to 13.8. The amount of the base can suitably be selected according to the desired sulfate content and other factors so that the pH can fall within the above range.

The precipitate formed upon addition of the base can be recovered by the known methods of recovery employed in coprecipitation and like processes, for example by filtration, and washing with water, followed by solid-liquid separation for recovery. After recovery, drying may be made if necessary.

In the production process according to the present invention, the precipitate recovered may be oxidized, where necessary, by heating in an oxidizing atmosphere or in the air. The heating temperature is generally not lower than 600° C., preferably not lower than 800° C. There in no particular upper limit to the heating temperature provided that the desired mixed oxide can be obtained. The heating time is not critical but, generally, 1 to 3 hours after arrival of the temperature of the mixed oxide at the predetermined level is sufficient. In the practice of the present invention, the grinding, classification and other treatments which are known in the art may be carried out before and/or after heating, if necessary.

The catalyst material for exhaust gas purification according to the present invention is a mixed oxide containing cerium, zirconium and sulfur, and the cerium- and zirconium-based mixed oxide contains sulfur in an amount of 0.5 to 5% by weight as sulfate ($SO_4$). The catalyst material for exhaust gas purification according to the present invention can suitably be used as a co-catalyst or promoter or as a catalyst support particularly for exhaust gas purification. This can be prepared, for example, by the production method of the present invention.

While the proportions of cerium and zirconium are not critical, those proportions mentioned hereinabove are preferred. Thus, the above-mentioned cerium- and zirconium-based mixed oxide of the present invention is preferred. This mixed oxide, too, can effectively be used as a promoter or co-catalyst or as a catalyst support for exhaust gas purification. It is also useful as a three-way catalyst (in particular promoter or co-catalyst or catalyst support) capable of oxidizing HC and CO and reducing NOx.

A catalyst can be produced by causing a catalyst metal (catalytically active component) to be supported on the above mixed oxide by the known catalyst supporting methods, such as impregnation method, ion exchange method and so on. More concretely, an aqueous solution containing a catalyst metal ion is added to a dispersion of the above mixed oxide (with a mean particle size of about 1 to 6 μm) in an alcohol such as methanol, in an amount of 0.2 to 5% by weight as the metal relative to said mixed oxide. The solid matter obtained is dried, if necessary, at 100 to 150° C. for 12 to 36 hours, and then further calcined at 400 to 550° C. for 1 to 12 hours, whereby a catalyst can be obtained. In the practice of the present invention, at least one of platinum group elements such as platinum, palladium, rhodium and iridium can suitably be used as the catalyst metal. The dispersion mentioned above may contain another catalyst metal and/or another catalyst support, for instance. The above supporting procedure may be repeated twice or more, if necessary.

In the practice of the present invention, the catalyst mentioned above may further be supported on a known catalyst support, if necessary. The catalyst support is not limited to any particular species but there may be mentioned, for example, honeycomb-shaped monolith supports and pellet-shaped supports. As the support materials, there may be mentioned, for example, ceramics materials such as mullite, alumina, cordierite and magnesia, and metallic materials such as ferrite steels. As regards the method of supporting, those catalyst supporting methods which are known in the art can be employed, as mentioned above. For instance, a catalyst can be produced by preparing a slurry by admixing the above catalyst in powder form with water or an alcohol, immersing a catalyst support in the slurry, and drying and calcining the coat layer on the support in the same manner as mentioned above. Said slurry may contain another catalyst metal and/or another catalyst support, for instance. This series of supporting procedures may be repeated twice or more to successively accumulate coat layers.

In the production process according to the present invention, as a result of addition of the base to the mixture, the substitution reaction between the sulfate ion in the cerous and alkali metal sulfate double salt and the hydroxide ion provided by the base and the hydroxylation reaction of the zirconium ion proceed simultaneously. On that occasion, the zirconium ion is hydroxylated selectively on the surface of cerium (precipitate). Chemically, this is a phenomenon due to the principle of post-precipitation or coprecipitation. By utilizing, according to the present invention, this characteristic reaction, a precipitate comprising cerium and zirconium uniformly united therein can be obtained with ease. It is considered that, in this reaction, the sulfate is chemically bound selectively to cerium or chemically adsorbed selectively on cerium owing to the difference in chemical affinity between sulfate and cerium or zirconium. This is also evident from the fact that the sulfate content is rather more influential on the oxidation-reduction performance than on the thermal stability of the specific surface area.

The mixed oxide of the present invention, which contains sulfur, in particular, in a specified amount in the mixed oxide of cerium and zirconium, can show excellent oxidation-reduction performance while maintaining the thermal stability of specific surface area at a practical level. In particular, the occurrence of sulfur on cerium oxide can result, under certain conditions, in a 1.2- to 1.5-fold improvement in oxidation-reduction performance as compared with cerium oxide itself. Therefore, this mixed oxide can be used as a catalyst material for exhaust gas purification and, in particular, it is useful as a promoter or co-catalyst or as a catalyst support.

According to the production process of the present invention, in which cerous sulfate-alkali metal sulfate double salt, in particular, is used as the cerium precursor, a cerium- and zirconium-based mixed oxide with high chemical uniformity can be produced with good reproducibility and relatively with ease. Therefore, the production process of the present invention is suited for production thereof on an industrial scale.

EXAMPLES

The following examples and comparative examples illustrate the characteristic features of the present invention in further detail. They are, however, by no means limitative of the scope of the present invention.

In the examples, the composition of the mixed oxide was determined by inductively coupled plasma (ICP) emission spectrometry. The hydrogen consumption was measured by the programmed temperature reduction method using the apparatus MULTITASK TPD (TPD-1-AT) (product of Japan Bell). The sulfate determination was performed by plasma ignition infrared absorption spectroscopy using the apparatus HORIBA EMIA-520 (product of Horiba Seisakusho).

In the examples, zirconium contained hafnium (1.3 to 2.5% by weight as hafnium oxide) as an unavoidable impurity.

Example 1

A mixture was prepared by dispersing cerous-sodium sulfate double salt (containing 75 g as cerium oxide) in 1,000 g of water and further adding an aqueous solution of zirconium nitrate (containing 25 g as zirconium oxide). Then, an aqueous solution of sodium hydroxide was added until the pH of the mixture became 13.5, whereby a precipitate was obtained. This precipitate was separated and recovered from the mixture and heated in the air at 600° C. for 5 hours. The mixed oxide obtained, when analyzed, showed the following composition: cerium oxide 73.9% by weight; zirconium oxide 24.1% by weight; and sulfate 2.0% by weight. This mixed oxide had a BET specific surface area of 68.5 $m^2/g$. The pore volume of the mixed oxide was 0.61 ml/g (measured by using "Autosorbe-l";Quanta chrom Co.). The lattice parameter of (222)plane in the cubic cerium oxide was 5.39 Å. The BET specific surface area measured after 3 hours of heat treatment at 1,000° C. was 20.5 $m^2/g$. The hydrogen consumption by the mixed oxide as measured after 3 hours of heat treatment at 1,000° C. was 15.2 cc/g.

Example 2

A mixture was prepared by dispersing cerous-sodium sulfate double salt (containing 74 g as cerium oxide) in 1,000 g of water and further adding an aqueous solution of zirconium nitrate (containing 24 g as zirconium oxide) and an aqueous solution of lanthanum nitrate (containing 2 g as lanthanum oxide). Then, an aqueous solution of sodium hydroxide was added until the pH of the mixture became 13.5, whereby a precipitate was obtained. This precipitate was separated and recovered from the mixture and heated in the air at 600° C. for 5 hours. The mixed oxide obtained had the following composition: cerium oxide 72.9% by weight; zirconium oxide 23.1% by weight; sulfate 2.1% by weight; and lanthanum oxide 1.9% by weight. This mixed oxide had a BET specific surface area of 72.5 $m^2/g$. The pore volume of the mixed oxide was 0.62 ml/g (measured by using "Autosorbe-1"; Quanta chrom Co.). The lattice parameter of (222)plane in the cubic cerium oxide was 5.38 Å. The BET specific surface area measured after 3 hours of heat treatment at 1,000° C. was 23.5 $m^2/g$. The hydrogen consumption by the mixed oxide as measured after 3 hours of heat treatment at 1,000° C. was 16.1 cc/g.

Example 3

A mixture was prepared by dispersing cerous-sodium sulfate double salt (containing 74 g as cerium oxide) in 1,000 g of water and further adding an aqueous solution of zirconium nitrate (containing 24 g as zirconium oxide) and an aqueous solution of yttrium chloride (containing 2 g as yttrium oxide). Then, an aqueous solution of sodium hydroxide was added until the pH of the mixture became 13.5, whereby a precipitate was obtained. This precipitate was separated and recovered from the mixture and heated in the air at 600° C. for 5 hours. The mixed oxide obtained had the following composition: cerium oxide 72.8% by weight; zirconium oxide 23.2% by weight; sulfate 2.0% by weight; and yttrium oxide 2.0% by weight. This mixed oxide had a BET specific surface area of 69.1 $m^2/g$. The BET specific surface area measured after 3 hours of heat treatment at 1,000° C. was 21.3 $m^2/g$. The hydrogen consumption by the mixed oxide as measured after 3 hours of heat treatment at 1,000° C. was 15.8 cc/g.

Example 4

A mixture was prepared by dispersing cerous-sodium sulfate double salt (containing 66 g as cerium oxide) in 1,000 g of water and further adding an aqueous solution of zirconium nitrate (containing 24 g as zirconium oxide) and an aqueous solution of lanthanum nitrate (containing 10 g as lanthanum oxide). Then, an aqueous solution of sodium hydroxide was added until the pH of the mixture became 13.5, whereby a precipitate was obtained. This precipitate was separated and recovered from the mixed solution and heated in the air at 600° C. for 5 hours. The mixed oxide obtained had the following composition: cerium oxide 65.1% by weight; zirconium oxide 23.1% by weight: sulfate 2.1% by weight; and lanthanum oxide 9.7% by weight. This mixed oxide had a BET specific surface area of 78.1 $m^2/g$. The BET specific surface area measured after 3 hours of heat treatment at 1,000° C. was 27.3 $m^2/g$. The hydrogen consumption by the mixed oxide as measured after 3 hours of heat treatment at 1,000° C. was 16.8 cc/g.

Example 5

A mixture was prepared by dispersing cerous-sodium sulfate double salt (containing 72 g as cerium oxide) in 1,000 g of water and further adding an aqueous solution of zirconium nitrate (containing 23 g as zirconium oxide) and an aqueous solution of titanium chloride (containing 5 g as titanium oxide). Then, an aqueous solution of sodium hydroxide was added until the pH of the mixture became 13.5, whereby a precipitate was obtained. This precipitate was separated and recovered from the mixture and heated in the air at 600° C. for 5 hours. The mixed oxide obtained had the following composition: cerium oxide 71.1% by weight; zirconium oxide 22.2% by weight; sulfate 2.0% by weight; and titanium oxide 4.7% by weight. This mixed oxide had a BET specific surface area of 67.9 $m^2/g$. The BET specific surface area measured after 3 hours of heat treatment at 1,000° C. was 22.3 $m^2/g$. The hydrogen consumption by the mixed oxide as measured after 3 hours of heat treatment at 1,000° C. was 15.1 cc/g.

Comparative Example 1

A mixture was prepared by dispersing ceric hydroxide (containing 75 g as cerium oxide) in 1,000 g of water and further adding an aqueous solution of zirconium nitrate (containing 25 g as zirconium oxide). Then, an aqueous solution of sodium hydroxide was added until the pH of the mixture became 13.5, whereby a precipitate was obtained. This precipitate was separated and recovered from the mixed solution and heated in the air at 600° C. for 5 hours. The mixed oxide obtained had the following composition: cerium oxide 74.9% by weight; and zirconium oxide 25.1% by weight. This mixed oxide had a BET specific surface area of 52.9 $m^2/g$. The BET specific surface area measured after 3 hours of heat treatment at 1,000° C. was 10.8 m²/g. The hydrogen consumption by the mixed oxide as measured after 3 hours of heat treatment at 1,000° C. was 4.1 cc/g.

Comparative Example 2

A mixed solution was prepared by adding an aqueous solution of zirconium nitrate (containing 25 g as zirconium oxide) to an aqueous solution of cerous sulfate (containing 75 g as cerium oxide). Then, an aqueous solution of sodium hydroxide was added until the pH of the mixed solution became 13.5, whereby a precipitate was obtained. This precipitate was separated and recovered from the mixed solution and fired in the air at 600° C. for 5 hours. The mixed oxide obtained had the following composition: cerium oxide 75.1% by weight; and zirconium oxide 24.9% by weight. This mixed oxide had a BET specific surface area of 67.1 m²/g. The BET specific surface area measured after 3 hours of heat treatment at 1,000° C. was 18.5 m²/g. The hydrogen consumption by the mixed oxide as measured after 3 hours of heat treatment at 1,000° C. was 4.2 cc/g.

Test Example 1
Relationship Between Sulfate Content and Specific Surface Area or Hydrogen Consumption Cerium- and zirconium-based mixed oxides were prepared in the same manner as in Example 2 with the composition ratio of $La_2O_3:CeO_2:ZrO_2=2:74:24$ (weight ratio) while varying the sulfate content. The catalysts obtained were checked for the changes in specific surface area and hydrogen consumption with the change in sulfate content. The results are shown in FIG. 1.

Test Example 2
Relationship Between Sulfate Content and Exhaust Gas Purification Rate (%)

Cerium- and zirconium-based mixed oxides were prepared in the same manner as in Example 2 with the composition ratio of $La_2O_3:CeO_2:ZrO_2=2:74:24$ (weight ratio) while varying the sulfate content as follows: 0% by weight, 0.6% by weight, 1% by weight and 2% by weight. Then, each mixed oxide adjusted to a mean particle size of 3 μm was dispersed in methanol, further 1% by weight of platinum was caused to be supported, and then the resulting mixture was wet-milled with the same weight of γ-alumina (mean particle size 20 μm) as that of the mixed oxide in a ball mill to give a slurry. A cordierite monolith support (inside diameter 33 mm×length 76 mm) having 400 cells per square centimeter was immersed in that slurry and, after taking out, the coat layer was dried at 110° C. for 24 hours and fired at 500° C. for 5 hours to give a test catalyst (amount of the coat supported=150 g/liter). This was further heat-treated in an electric oven at 1,000° C. for 5 hours.

Then, using a model gas adjusted to the ordinary exhaust gas composition, the catalysts prepared in the above manner were examined for their performance under the conditions: gas temperature at the inlet to the catalyst 450° C. and space velocity 60,000 liter/hour. The gas at the inlet to the catalyst and the gas at the outlet therefrom were analyzed simultaneously and the purification percentages with regard to CO, HC and NOx were determined. The results are shown in FIG. 2.

Figure 2:
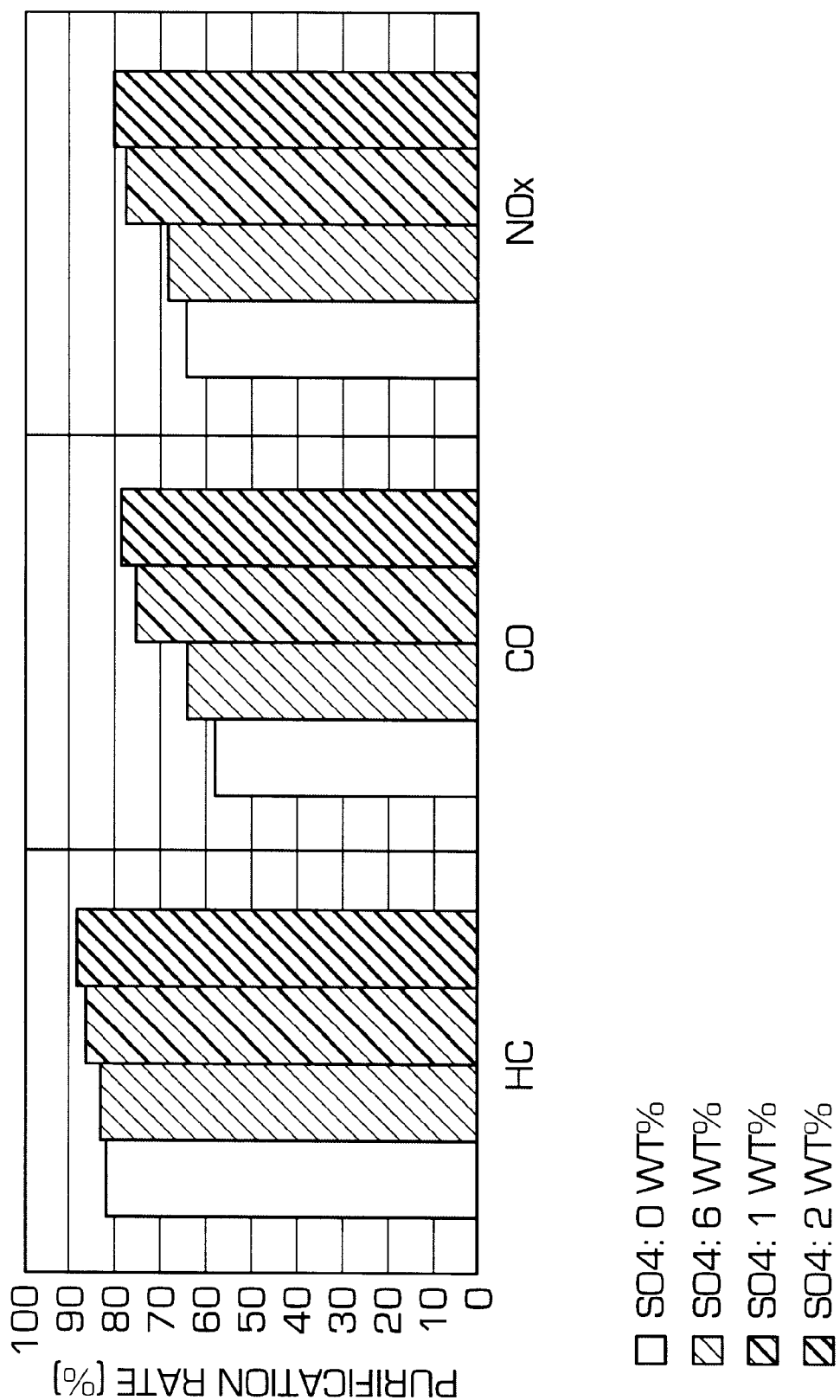
FIG. 2 is a graphic representation of the results of an investigation of the effect of the sulfate content on the extent of exhaust gas purification as obtained in Test Example 2.

The results shown in FIG. 2 indicate that when the catalyst has a sulfate content of not less than 0.5% by weight, it can produce better exhaust gas purifying effects.

Test Example 3
Relationship Between Sulfate Content and $T_{50}$

Test catalysts prepared in the same manner as in Test Example 2 were heat-treated at 1,000° C. for 5 hours in an electric oven.

Then, using a model gas adjusted to the ordinary exhaust gas composition, the catalysts treated in the above manner were examined for their performance ($T_{50}$, light-off temperature) at a space velocity of 60,000 liter/hour while varying the gas temperature at the inlet to the catalyst continuously within the range of 200 to 500° C. The gas at the inlet to the catalyst and the gas at the outlet therefrom were analyzed simultaneously and the temperatures ($T_{50}$) at which the purification percentages with regard to CO, HC and NOx respectively amounted to 50% were determined. The results are shown in FIG. 3.

From the results shown in fig. 3, it is seen that when the catalyst has a sulfate content of not less than 0.5% by weight, it can produce better exhaust gas purifying effects in a lower temperature region.

What is claimed is:

1. A cerium- and zirconium-based mixed oxide containing cerium, zirconium and sulfur which has the composition: 50 to 79% by weight as cerium oxide, 20 to 49% by weight as zirconium oxide and 1 to 5% by weight as sulfate($SO_4$).

2. A cerium- and zirconium-based mixed oxide as claimed in claim 1 which further comprises at least one member selected from the group consisting of (1) rare earth elements other than cerium, (2) titanium and (3) hafnium contained therein in an amount not exceeding 20% by weight calculated as the oxide thereof.

3. A cerium- and zirconium-based mixed oxide as claimed in claim 1, wherein the hydrogen consumption after 3 hours of heat treatment at 1,000° C. is not less than 15 cc/g.

4. A cerium- and zirconium-based mixed oxide as claimed in claim 1, wherein the BET specific surface area after 3 hours of heat treatment at 1,000° C. is not less than 20 m²/g.

5. A method of producing a cerium- and zirconium-based mixed oxide which comprises mixing a cerous-alkali metal sulfate double salt and a zirconium ion-containing solution and adding a base to the resulting mixed solution to thereby form a precipitate.

6. A method as claimed in claim 5, wherein the mixed solution further contains ions of at least one member selected from the group consisting of (1) rare earth elements other than cerium, (2) titanium and (3) hafnium.

7. A method as claimed in claim 5 or 6, wherein the precipitate is heated at a temperature not lower than 600° C.

8. A method as claimed in claim 5 or 6, wherein the precipitate is heated at a temperature not lower than 800° C.

9. A catalyst material for exhaust gas purification which comprises a mixed oxide containing cerium, zirconium and sulfur, which comprises a cerium- and zirconium-based mixed oxide containing sulfur in an amount of 0.5 to 5% by weight as sulfate($SO_4$).

10. A co-catalyst or promoter for exhaust gas purification which comprises a mixed oxide containing cerium, zirconium and sulfur, which comprises a cerium- and zirconium-based mixed oxide containing sulfur in an amount of 0.5 to 5% by weight as sulfate($SO_4$).

11. A catalyst support for exhaust gas purification which comprises a mixed oxide containing cerium, zirconium and sulfur, which comprises a cerium- and zirconium-based mixed oxide containing sulfur in an amount of 0.5 to 5% by weight as sulfate($SO_4$).

12. A catalyst material for exhaust gas purification which comprises a cerium- and zirconium-based mixed oxide as defined in any of claims 1 to 4.

13. A co-catalyst or promoter for exhaust gas purification which comprises a cerium- and zirconium-based mixed oxide as defined in any of claims 1 to 4.

14. A catalyst support for exhaust gas purification which comprises a cerium- and zirconium-based mixed oxide as defined in any of claims 1 to 4.

* * * * *